(12) United States Patent
Mäckle et al.

(10) Patent No.: US 12,398,754 B2
(45) Date of Patent: Aug. 26, 2025

(54) LINEAR GUIDE DEVICE

(71) Applicant: Festo SE & Co. KG, Esslingen (DE)

(72) Inventors: Felix Mäckle, Esslingen (DE); Alexander Maischberger, Ostfildern-Nellingen (DE)

(73) Assignee: Festo SE & Co. KG, Esslingen (DE)

( * ) Notice: Subject to any disclaimer, the term of this patent is extended or adjusted under 35 U.S.C. 154(b) by 124 days.

(21) Appl. No.: 18/447,648

(22) Filed: Aug. 10, 2023

(65) Prior Publication Data

US 2024/0052883 A1    Feb. 15, 2024

(30) Foreign Application Priority Data

Aug. 10, 2022 (DE) ...................... 10 2022 120 154.6

(51) Int. Cl.
     *F16C 29/00*      (2006.01)
     *F16C 29/06*      (2006.01)
     *F16C 29/12*      (2006.01)

(52) U.S. Cl.
     CPC .......... *F16C 29/001* (2013.01); *F16C 29/063* (2013.01); *F16C 29/126* (2013.01)

(58) Field of Classification Search
CPC ..... F16C 29/001; F16C 29/063; F16C 29/126
See application file for complete search history.

(56) References Cited

U.S. PATENT DOCUMENTS

| 3,455,610 | A | * | 7/1969 | Meinke | ..................... B23Q 1/40 |
| | | | | | 384/44 |
| 4,231,621 | A | | 11/1980 | Teramachi | |
| 4,550,955 | A | | 11/1985 | Grabher et al. | |
| 4,643,591 | A | | 2/1987 | Schwarz | |
| 8,313,239 | B2 | * | 11/2012 | Ju | ......................... F16C 29/048 |
| | | | | | 384/57 |

FOREIGN PATENT DOCUMENTS

| DE | 29 11 721 | 3/1979 |
| DE | 34 38 059 | 10/1984 |
| DE | 10 2011 006 323 | 10/2012 |
| DE | 10 2020 204 569 | 10/2021 |
| EP | 0 142 069 | 5/1985 |

OTHER PUBLICATIONS

Examination Report issued in corresponding German Patent Application No. 10 2022 120 154.6, May 8, 2023, 5 pages.

* cited by examiner

*Primary Examiner* — James Pilkington
(74) *Attorney, Agent, or Firm* — HSML P.C.

(57) ABSTRACT

A linear guide device having a guide carriage with two guide units, each guide unit including two guide modules abutting guide surfaces of a base structure in an operating position of the guide carriage. One of the two guide modules is an adjustable guide module, which is adjustable by means of one of two adjustment units to set a pretension between the guide modules and the guide surfaces. For synchronous actuation of the two adjustment units, a central actuating device is provided which is drivingly coupled to both adjustment units.

21 Claims, 7 Drawing Sheets

LINEAR GUIDE DEVICE

CROSS-REFERENCE TO RELATED APPLICATIONS

This application claims priority to German application 10 2022 120 154.6, filed Aug. 10, 2022, which is incorporated by reference.

BACKGROUND

The invention relates to a linear guide device with a guide carriage
- featuring a carriage base body, which has two guide units arranged one after the other in a carriage longitudinal direction, each with a first guide module arranged on the carriage base body and a second guide module arranged opposite the first guide module on the carriage base body at a distance in a carriage transverse direction orthogonal to the carriage longitudinal direction,
- wherein the guide carriage, in its operating position, is supported linearly movably on a base structure in the carriage longitudinal direction, wherein the two first guide modules bear against a first guide surface and the two second guide modules bear against a second guide surface of the base structure so as to be movable with respect thereto,
- wherein one of the two guide modules of each guide unit is an adjustable guide module and each of the two guide units is provided with one of two adjustment units arranged successively in the carriage longitudinal direction, by means of which the associated adjustable guide module is admittable by an adjusting force to cause an adjustment which is oriented in the carriage transverse direction, relative to the carriage base body, wherein a pretension is adjustable with which the two guide modules of the guide unit are pressed against the respectively associated first or second guide surface of the base structure in the operating position of the guide carriage.

A linear guide device of this type known from DE 10 2020 204 569 A1 has a guide carriage which is supported linearly movably on two mutually facing first and second guide surfaces of a base structure having a longitudinal extension. The movement direction coincides with a carriage longitudinal direction of the guide carriage. For the support, the guide carriage can have two guide units arranged on a carriage base body and arranged in succession in the carriage longitudinal direction. Each guide unit has a first guide module arranged stationary on the carriage base body and a second guide module lying opposite the first guide module in a carriage transverse direction, the second guide module being an adjustable guide module whose relative position assumed with respect to the carriage base body in the carriage transverse direction can be variably adjusted by carrying out an adjusting movement. In the operating position of the guide carriage, the two first guide modules are pressed against the first guide surface and the two adjustable second guide modules are pressed against the second guide surface of the base structure. Each guide unit has its own adjustment unit which makes it possible to apply an adjustment force to the adjustable guide module in order to cause the adjusting movement and to set a pretension with which the two guide modules of the respective guide unit are pressed against their respective guide surface of the base structure. Each adjustment unit contains a displacement medium arranged in the carriage base body, which can be subjected to a displacement force by an actuator in order to generate the adjustment force acting on the adjustable guide module. The adjusted pretension has a decisive effect on the precision with which the guide carriage is guided on the base structure during its intended use.

The presence of two axially spaced separate guide units offers the advantage of being able to absorb relatively high lateral forces as well as tilting forces and torques acting on the guide carriage. In this context, the set pretensions of the two guide units should lie in a comparable range. However, the adjustment of the two guide units to each other in this respect is relatively complex.

Pretension elements are known from EP 0 142 069 A2, with which individual guide modules designed as circulation shoes can be individually adjusted with respect to their pretension in relation to a longitudinal guide. Each guide module is assigned its own pretensioning element. The pretension element has a housing which is supported on the guide module and in which two parts are arranged which can be adjusted by means of a tensioning screw and which interact with wedge surfaces of a support plate arranged on the guide carriage.

SUMMARY OF THE INVENTION

The invention is based on the problem of taking measures which enable precise adjustment of the pretension acting between the two guide units and the associated guide surfaces in a simple manner.

To solve this problem, it is provided in accordance with the invention, in conjunction with the features mentioned at the beginning, that the guide carriage features a central actuating device drivingly coupled to the adjustment units of both guide unit, through the actuation of which synchronous adjusting forces can be exerted on the two adjustable guide modules.

In this way, there is the advantageous possibility of adjusting the pretension, also referred to as guide pretension, between the guide modules of the two guide units and the associated guide surfaces of a base structure by means of a uniform actuation process, and in this way to obtain a pretension of comparable intensity for all guide modules with little effort. In this way, the forces acting on the guide carriage during operation can be absorbed jointly by the guide modules of both guide units, resulting in a high load capacity of the linear guide measures. By means of the central actuating device, the adjustment units of the two guide units are drive-coupled to each other, so that actuation of the central actuating device results in simultaneous actuation of both adjustment units, with the result that synchronous adjusting forces are generated with respect to the two adjustable guide modules. The drive coupling allows mutual feedback between the two adjustment units, so that the pretension forces can be distributed evenly and ultimately, with a single adjustment process, both guide units can be easily adjusted so that the guide carriage is precisely guided in its operating position and can absorb high lateral forces and torques with low susceptibility to wear. The assembly time for the linear guide device is significantly reduced by the measures according to the invention compared to the prior art, so that a cost-effective production of the linear guide device is possible.

Advantageous further embodiments of the invention can be seen from the dependent claims.

Preferably, all guide modules are designed as rolling-element guide modules, which rest with rolling bearing elements on the respectively assigned guide surface of the base structure. When the guide carriage moves relative to the base structure, the rolling bearing elements may roll on the associated guide surface. The rolling-element guide modules are preferably designed as recirculating ball guide modules, which advantageously each feature at least one internal recirculating channel in which a plurality of spherical rolling bearing elements are accommodated, which may recirculate in the recirculating channel in the channel longitudinal direction. It is advantageous that each guide module contains two circulation channels arranged adjacent to one another with rolling bearing elements accommodated therein.

Each adjustment unit is advantageously arranged in the carriage transverse direction between the first guide module and the second guide module of the associated guide unit. This allows a compact construction. Furthermore, in this manner, the two adjustment units can be coupled to each other via the central actuating device by a short distance/route, i.e., a short connection distance.

In a particularly preferred embodiment, the two adjustment units are each designed as a wedge gear. An actuating force effective in the carriage longitudinal direction can be introduced into each wedge gear via the central actuating device, which can be converted by the wedge gear into an adjusting force effective orthogonally to the carriage longitudinal direction, which acts on the adjustable guide module of the respective guide unit. The design of the respective wedge gear can be used to achieve a desired force transmission ratio that makes it possible to generate high setting forces from a relatively low actuating force. Wedge gears as such are known in various designs, for example from DE 10 2011 006 323 A1.

The two wedge gears are advantageously designed so that their actuating directions are opposite to each other. The actuating forces generated by the central actuating device are introduced into the two wedge gears in opposite directions in the carriage longitudinal direction. Preferably, each wedge gear has a wedge-shaped adjusting element that can also be referred to as wedge element, with the two wedge-shaped adjusting elements being simultaneously pushed away from each other, i.e., apart, when the central actuating device is actuated. However, the wedge gears may also be designed in such a way that the two wedge-shaped adjusting elements can be acted upon simultaneously by the central actuating device in a direction towards each other in order to generate the respective adjusting force.

In an advantageous further development, each of the two adjustment units has a movable adjusting element drivable relative to the carriage base body for a driving movement in the carriage longitudinal direction and an with respect to the carriage base body in the carriage longitudinal direction immovable adjusting element. The immovable adjusting element immovable in the carriage longitudinal direction, which for simplification purposes will also be referred to below simply as the "immovable adjusting element", is arranged in an absolutely immovable manner on the carriage base body in an advantageous embodiment and in particular is formed integrally with the carriage base body.

In both adjustment units, the movable adjusting element is force-transmittingly coupled to the adjustable guide element for exerting the adjusting force in the carriage transverse direction.

Furthermore, in each adjustment unit, each of the two adjusting elements belonging thereto is provided with one of two force-deflecting surfaces abutting against each other in a relatively slidable manner, such that they can slide relative to one another, of which at least one is in the form of an oblique surface inclined with respect to the carriage longitudinal direction and to the carriage transverse direction. When a movable adjusting element executes a driving movement in the carriage longitudinal direction as a result of an actuation of the central actuating device, the force deflection surface formed on it slides on the force deflection surface of the immovable adjusting element, resulting in the adjusting movement of the associated adjustable guide module oriented transversely to the driving movement.

The driving movement of the movable adjusting element and the adjusting movement of the adjustable guide module take place in each guide unit as simultaneously overlapping movements.

Preferably, the movable adjusting element of each adjustment unit features a pressing surface facing the adjustable guide module, in particular in the carriage transverse direction. With this pressing surface, the movable adjusting element rests against a force-receiving surface of the adjustable guide module, wherein the adjustable guide module is supported immovably with respect to the carriage base body in the carriage longitudinal direction, so that it is movable exclusively in the carriage transverse direction. During the driving movement of the movable adjusting element, the movable adjusting element slides with its pressing surface in the carriage longitudinal direction against the force receiving surface of the adjustable guide module, so that the axial relative position between the movable adjusting element and the adjustable guide module changes, wherein the movable adjusting element simultaneously exerts the adjusting force on the adjustable guide module due to a superimposed transverse movement. In particular, the pressure surface is designed and arranged in such a way that a normal vector perpendicular to the pressing surface is aligned in the same way in the carriage transverse direction as a normal vector of the force-absorbing surface.

Of the two mutually abutting force deflection surfaces, only one may in principle be formed as an oblique surface, while the other may be formed on one or more cam-like projections so that it only abuts the oblique surface at certain points. In terms of optimum force transmission and low-wear design, however, it is advantageous if each of the two force deflection surfaces abutting each another is designed as an oblique surface inclined to the longitudinal axis of the carriage, i.e., within a respective adjustment unit with the same inclination. In this way, large area of contact between the force deflection surfaces abutting each other can be ensured.

It is considered advantageous if the inclination of the at least one force deflection surface of one adjustment unit is opposite to that of the at least one force deflection surface of the other adjustment unit. In this case, the two movable adjusting elements can be driven by the central actuating device to mutually oppositely oriented driving movements with respect to the carriage longitudinal direction in order to generate the adjusting forces acting on the adjustable guide module. In particular, the inclinations are aligned in such a way that the adjustment forces result from driving movements of the movable adjustment units directed away from each other, i.e., with movable adjustment elements moving away from each other in the carriage longitudinal direction.

In principle, the central actuating device may be designed to be actuated by a motor and may feature, for example, an electric drive unit or a drive unit actuated by fluid power and in particular pneumatically, which in particular also permits remote actuation. However, since the desired pretension usually must be adjusted only once, namely during assembly of the linear guide device, it is considered more favorable if the central actuating device is of a manually actuatable design and has at least one actuating member for manual actuation.

At least one actuating member can be assigned to one of the two axial end faces of the guide carriage so that a good accessibility is provided. Preferably, the central actuating device is equipped with two actuating members, which are assigned in particular to opposite axial end regions of the guide carriage and which can be used alternatively to set the desired pretension. The at least one actuating member is particularly a screw member.

A particularly simple and compact adjustment mechanism is characterized by the fact that the central actuating device for drive coupling with the two adjustment units features a rod-shaped coupling structure, referred to as a rod coupling structure, which, with compact dimensions, allows opposing actuating forces to be introduced synchronously into the two movable adjusting elements of the two adjustment units in the carriage longitudinal direction in order to generate the adjustment forces of the two adjustment units. The rod coupling structure can bridge a distance existing between the two adjustment units in order to engage the two movable adjusting elements.

It is convenient if the rod coupling structure features a coupling rod extending between the two movable adjusting elements, bridging the distance between the two movable adjusting elements, while being axially supported with respect to each movable adjustment element. On at least one of the two movable adjusting elements, a rotatable actuating member of the rod coupling structure cooperating with the coupling rod is arranged, on which the coupling rod is axially supported with respect to the respective movable adjusting element. A rotary actuation of the at least one actuating member may cause a change in distance between the two movable adjusting elements, with which the driving movements of the two movable adjusting elements are accompanied.

For example, the coupling rod may be fixed to one of the two movable adjusting elements and only cooperate with a rotatable actuating member fixed to the other movable adjusting elements, which is formed separately in this respect.

A particularly advantageous embodiment is considered to be one in which the rod coupling structure features in each movable adjusting element a threaded hole extending in the carriage longitudinal direction, into which the coupling rod extends axially displaceable with one of its two end sections, wherein an actuating member formed as a screw member is screwed into each threaded hole, on which the coupling rod with its associated end section is supported at the end face and which actuating member is axially adjustable by rotation relative to the associated movable adjusting element. Preferably, each threaded hole is provided with an internal thread only over a partial length in which the screw member extends. A threadless length section of the threaded hole may be provided to receive the associated end section of the preferably cylindrically formed coupling rod in a linearly displaceable guided manner.

Preferably, once the pretension has been set, i.e., in the operating position of the guide carriage, the adjustable guide modules are stationary fixed to the carriage base body. For this purpose, a fastening device can be assigned to each adjustable guide module, for example in the form of a screw fastening device with one or two clamping screws. The pretension is set when the fastening devices are deactivated and fixed unchangeably after setting by activating the fastening devices. In particular, the fixation can be detachable so that readjustments of the pretension are possible if required. In a design as a screw connection device, the deactivated state corresponds to a loosened screw connection and the activated state to a tightened screw connection.

The linear guide device advantageously contains the base structure already mentioned, wherein this base structure features a longitudinal extension and has the first and second guide surfaces already mentioned. The two guide surfaces are arranged at a distance from one another. Preferably, the two guide surfaces face each other, wherein the two guide units are arranged at least partially in a clearance of the base structure present between the two guide surfaces. The guide carriage is supported linearly movably on the base structure in the longitudinal direction thereof, in that it bears movably against the first guide surface with its two first guide modules and against the second guide surface with its two second guide modules. Guide modules designed as rolling-element guide modules rest with their rolling bearing elements in a rollable manner against the respectively assigned guide surface.

BRIEF DESCRIPTION OF THE DRAWINGS

The invention is explained in more detail below with reference to the accompanying drawing. Showing.

DETAILED DESCRIPTION OF THE INVENTION

The linear guide device, designated overall by reference sign 1, has a longitudinal extension along an imaginary longitudinal axis 2 and also has a transverse axis 3 perpendicular to the longitudinal axis 2 and a vertical axis 12 orthogonal to the longitudinal axis 2 and the transverse axis 3.

One of several components of the linear guide device 1 is a base structure 4 having a longitudinal extension and extending along the longitudinal axis 2. The base structure 4 has a base body 5 exemplarily having a U-shaped cross-section, on which a first guide surface 6 and a second guide surface 7 opposite the first guide surface 6 at a distance in the axial direction of the transverse axis 3 are formed. The two guide surfaces 6, 7 each have a strip-shaped longitudinal form and extend parallel to the longitudinal axis 2.

The base body 5 has two leg sections 8a, 8b opposite each other in the axial direction of the transverse axis 3, which longitudinally delimit a base body intermediate space 9 on opposite sides. On the inner sides of each leg section 8a, 8b facing the base body clearance 9, one of the two first and second guide surfaces 6, 7 is formed, which thus face each other.

The linear guide device 1 has an upper side 13 facing in the axial direction of the vertical axis 12 and a lower side 14 opposite thereto. The gutter-shaped base body clearance 9 is open longitudinally towards the upper side 13.

The linear guide device 1 includes a guide carriage 15 which, in its operating position as shown in FIGS. 1 to 6, is supported linearly movably on the base structure 4 in the axial direction of the longitudinal axis 2. Unless otherwise specified in an individual case, the following description refers to this operating position.

The guide carriage 15 has a carriage longitudinal axis 16 which extends parallel to the longitudinal axis 2 and whose axial direction is designated as carriage longitudinal direction 16a for better differentiation. The linear movement 17, indicated by a double arrow, executable by the guide carriage 15 with respect to the base structure 4, is executable in the carriage longitudinal direction 16a as arbitrarily reciprocating movement.

The guide carriage 15 further has a carriage transverse axis 18 extending in a carriage transverse direction 18a orthogonal to the carriage longitudinal direction 16a, and a carriage vertical axis 19 extending in a carriage vertical direction 19a orthogonal to the carriage longitudinal direction 16a and to the carriage transverse direction 18a. The longitudinal axis 2 and the carriage longitudinal axis 16, furthermore the transverse axis 3 and the carriage transverse axis 18, and finally the vertical axis 12 and the carriage vertical axis 19 are respectively parallel to each other.

The guide carriage 15 is equipped with two guide units 22, 23 arranged in succession in the longitudinal direction 16a of the carriage, which are in the following also referred to as the first guide unit 22 and the second guide unit 23 for better differentiation. The two guide units 22, 23 are in particular components of a lower end section 24 of the guide carriage 15, which extends into the base body clearance 9 from the upper side 13. The two guide units 22, 23 are conveniently spaced apart from each other in the carriage longitudinal direction 16a.

Each of the two guide units 22, 23 includes a first guide module 25 and a second guide module 26 spaced with respect thereto in the carriage transverse direction 18a. With respect to the carriage transverse direction 18a, the two first guide modules 25 are located on one side of the central carriage longitudinal axis 16, while the two second guide modules 26 are located on the opposite side of the carriage longitudinal axis 16.

The two first guide modules 25 and the two second guide modules 26 are each arranged in succession at a distance from each other in the longitudinal direction 16a of the carriage.

The two first guide modules 25 rest movably against the first guide surface 6 in this respect, while the two second guide modules 26 bears movably against the second guide surface 7 in this respect. During the linear movement 17, the guide modules 25, 26 move along the respective associated guide surface 6, 7, wherein the contact between the guide modules 25, 26 and the guide surfaces 6, 7 results in a transverse support of the guide carriage 15 with respect to the base structure 4 in the carriage transverse direction 18a, so that an exact linear movement 17 of the guide carriage 15 is possible.

During operation of the linear guide device 1, an object to be guided is usually fixed to the guide carriage 15, for example a component of a machine. For fastening the object, the guide carriage 15 is equipped with at least one fastening interface 29, which are exemplarily designed as fastening holes. During operation of the linear guide device 1, transverse forces introduced into the guide carriage 15 by the attached object are absorbed by the base body 5 through the guide contact between the guide modules 25, 26 and the guide surfaces 6, 7.

Figure 1:
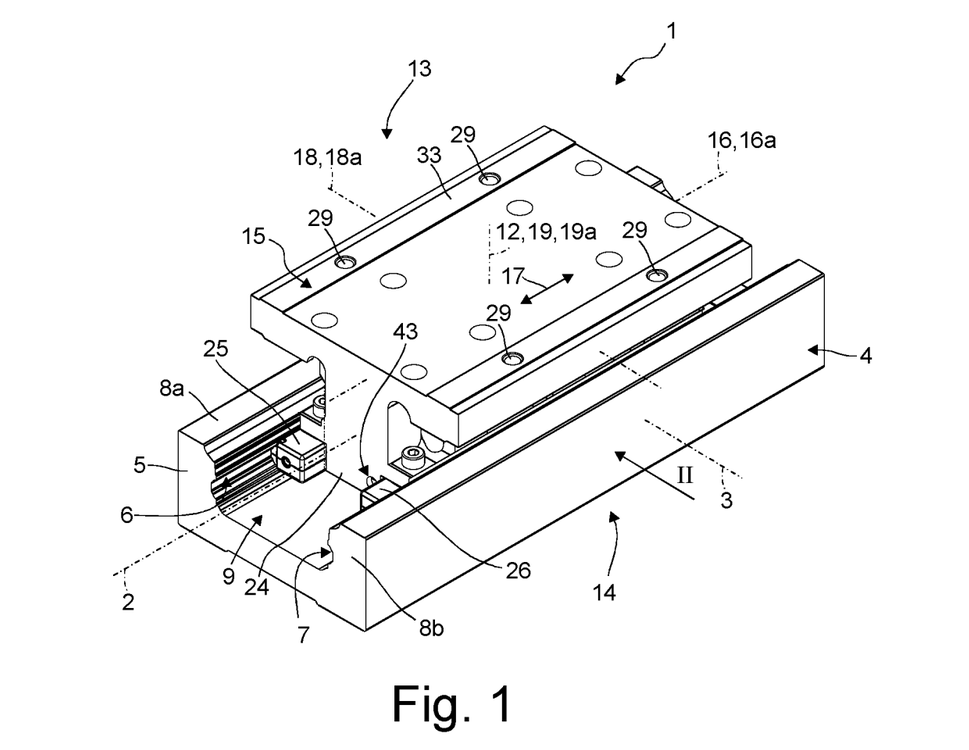
FIG. 1 a preferred embodiment of the linear guide device according to the invention in an isometric representation with a guide carriage supported linearly movably on a base structure, FIG. 2 a side view of the linear guide device with viewing direction according to arrow II in FIG. 1, FIG. 3 a half cross-section of the linear guide device according to cut line III-III in FIG. 2, wherein only the left half of the image is partially cut, and the right half of the image is uncut, FIG. 4 an axial front view of the linear guide device with the direction of view according to arrow IV in FIG. 2, FIG. 5 a stepped longitudinal cut of the linear guide device with a view at the guide carriage according to cutting line V-V in FIG. 3, FIG. 6 a further stepped longitudinal cut of the linear guide device looking with a view from below at the base structure according to cut line VI-VI in FIG. 3, FIG. 7 an isometric exploded view of the linear guide device, FIG. 8 an isometric bottom view of the guide carriage without representation of the base structure combined with the guide carriage in the operating position, and FIG. 9 a perspective view of the guide carriage of the linear guide device analogous to FIG. 8, but with a longitudinal cut in the area of the guide units according to cut plane IX-IX in FIG. 4.
Figure 2:
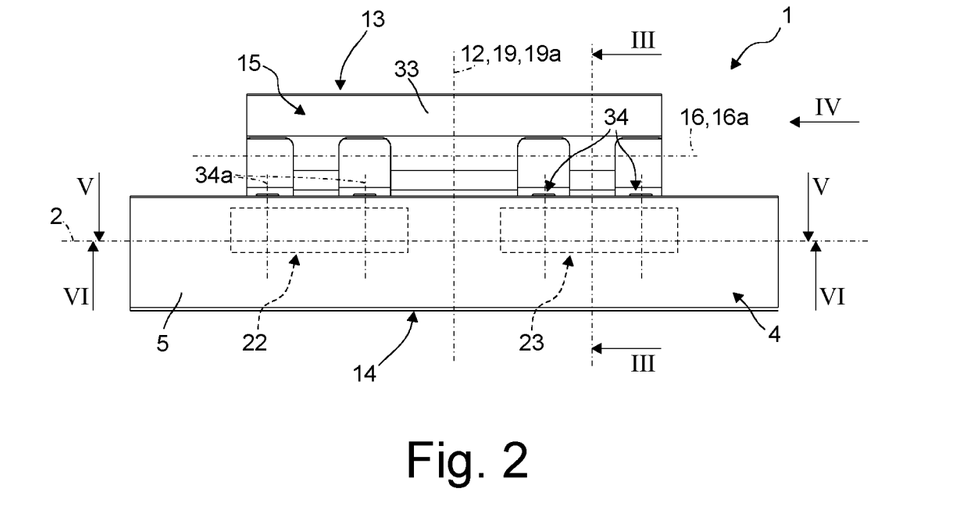
Figure 3:
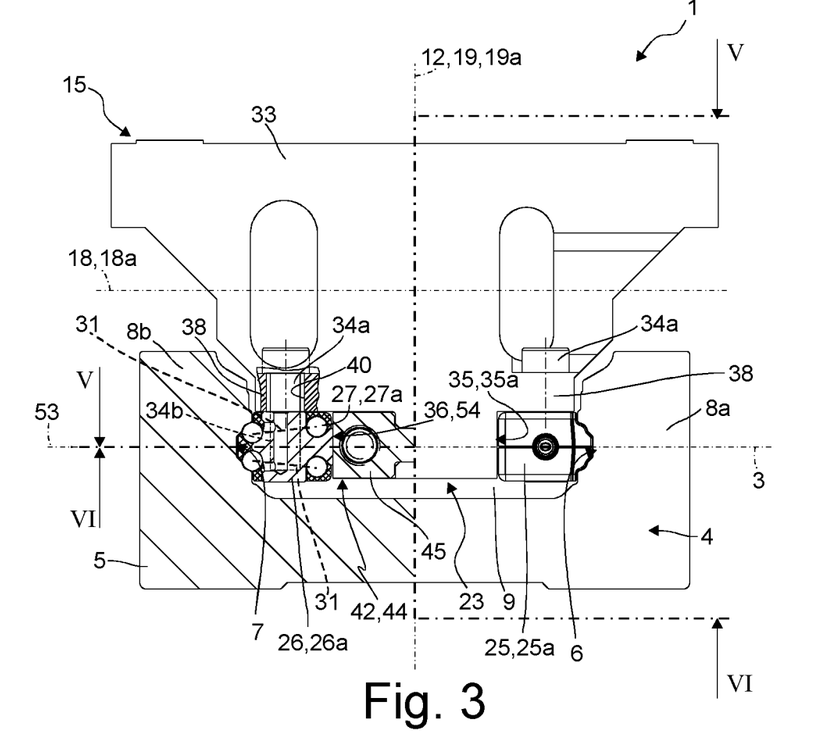
Figure 4:
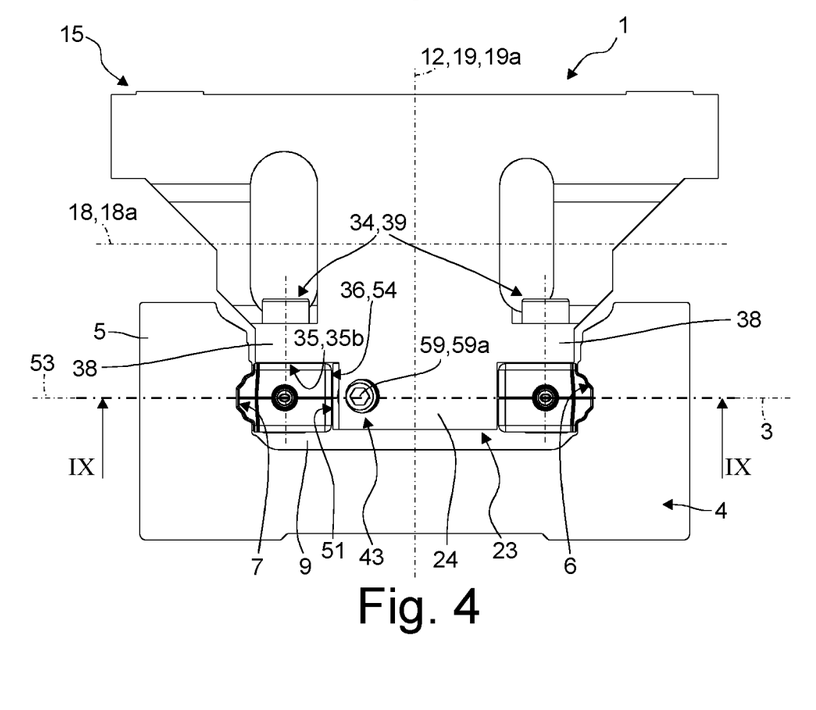

Exemplarily, the base structure 4 also absorbs torques and tilting moments, which can be attributed to a design and profiling of the guide modules 25, 26 and the guide surfaces 6, 7 that can be seen in FIGS. 3 and 4.

Each guide module 25, 26 has at least one guide element 27 with which it rests against the associated guide surface 6, 7 with support. According to an unillustrated embodiment, the guide element 27 is a sliding element which slides along the associated guide surface 6, 7 during the linear movement 17. Preferably and in accordance with the illustrated embodiment, all guide modules 25, 26 are designed as rolling-element guide modules, each of which has a plurality of guide elements 27, which are designed as rolling bearing elements 27a, which rollable rest on the respectively associated guide surface 6, 7. The rolling bearing elements 27a can, for example, be of roller-shaped or spherical design.

Exemplarily, the rolling bearing elements 27a are spherical in shape, wherein a preferred characteristic is that the guide modules 25, 26 are designed as recirculating ball guide modules.

Each guide module 25, 26 has a housing, in particular a multi-part housing, designated as a guide housing 28, in which two closed circulation channels 31 are formed, lying one above the other in the carriage vertical direction 19a, in which in each case a multiplicity of rolling bearing elements 27a are accommodated in a row, which during the linear movement 17 execute a circulation movement 32, indicated by a double arrow, in the associated circulation channel 31. Each circulation channel 31 has, on the longitudinal side facing the guide surface 6, 7, a slot-like opening through which the rolling bearing elements 27a, which are currently located in its area, may partially project in order to be in guide contact with the opposite first or second guide surface 6, 7 and to roll thereon while executing the circulation movement 32.

Figure 5:
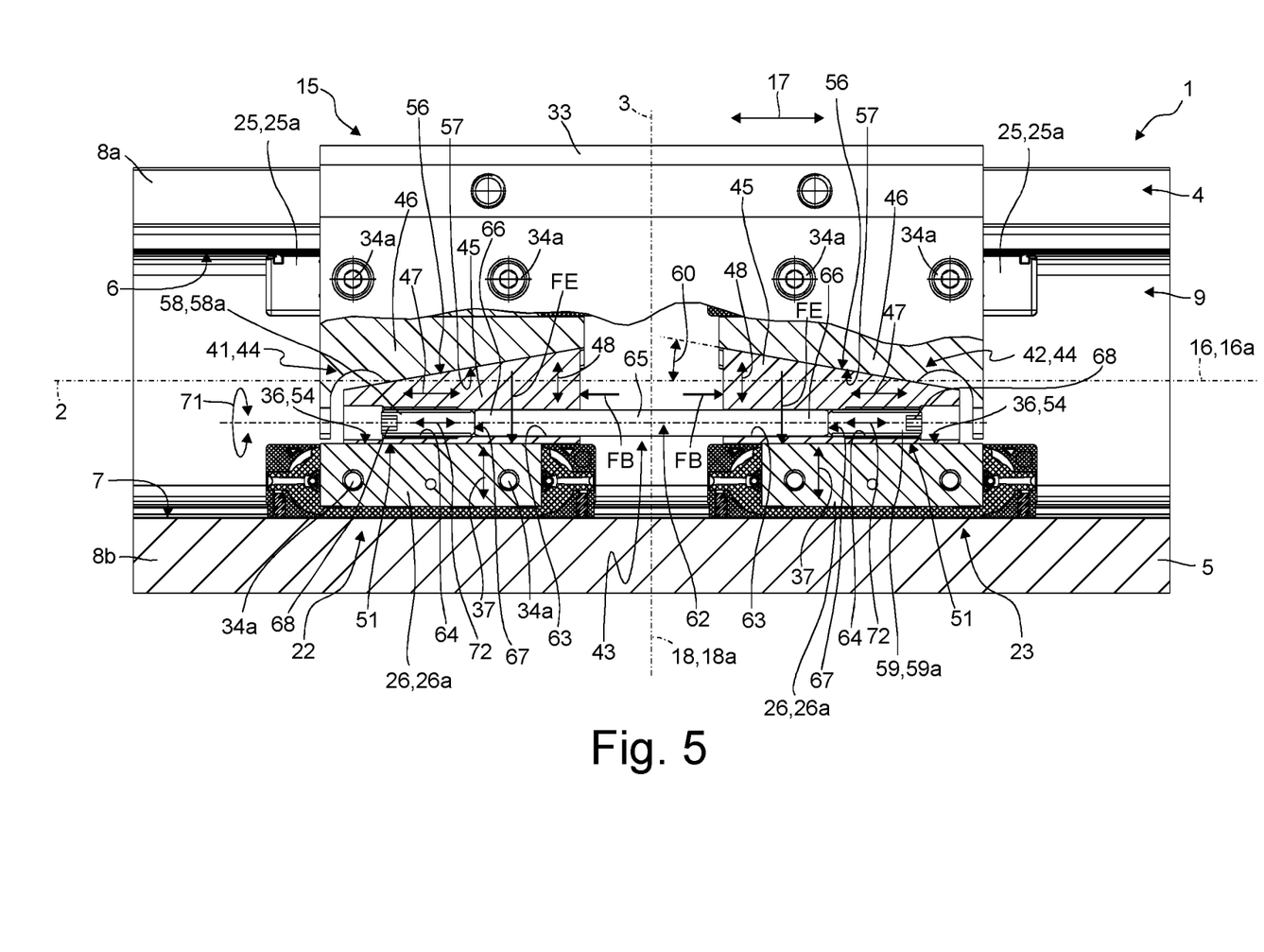
Figure 6:
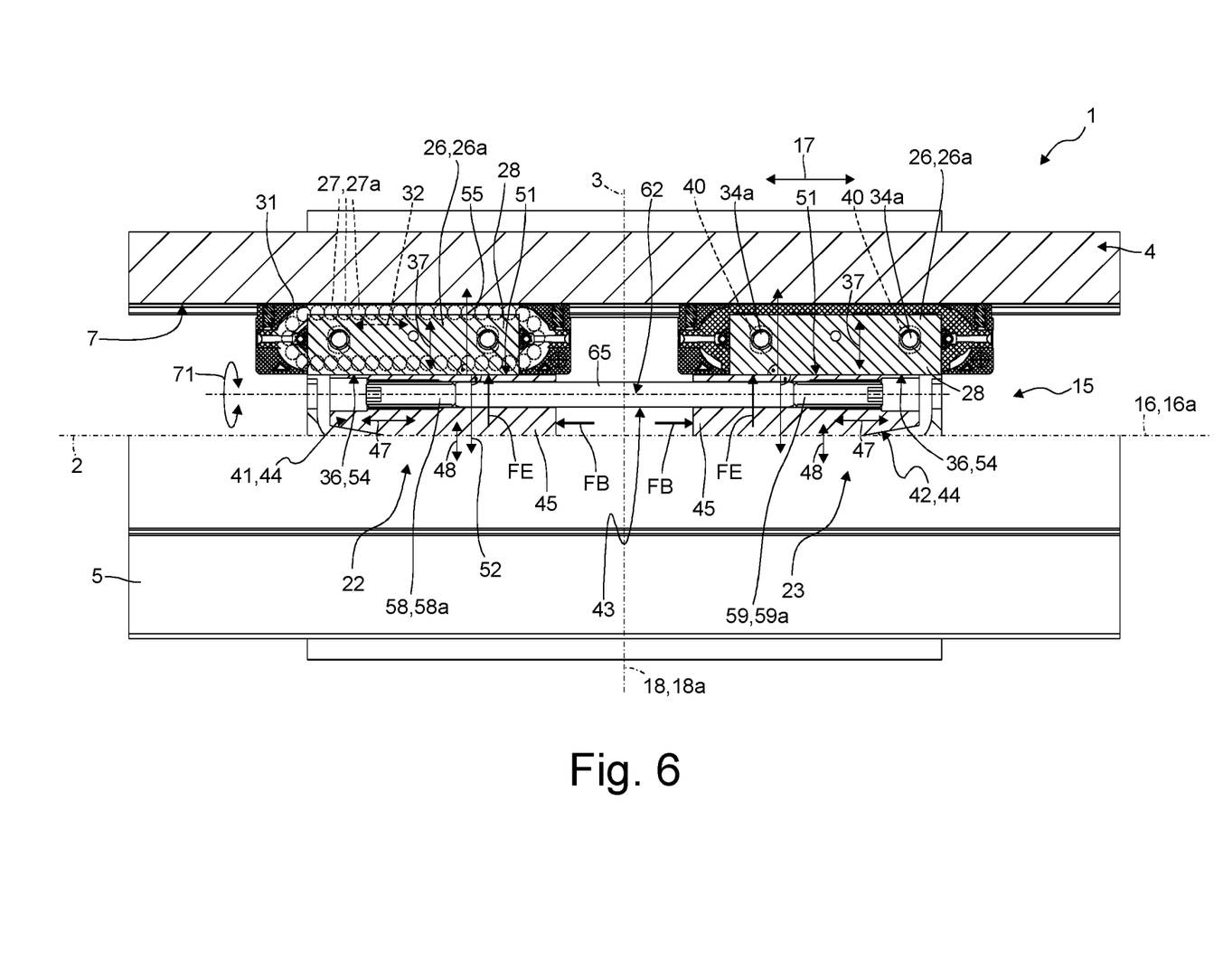
Figure 7:
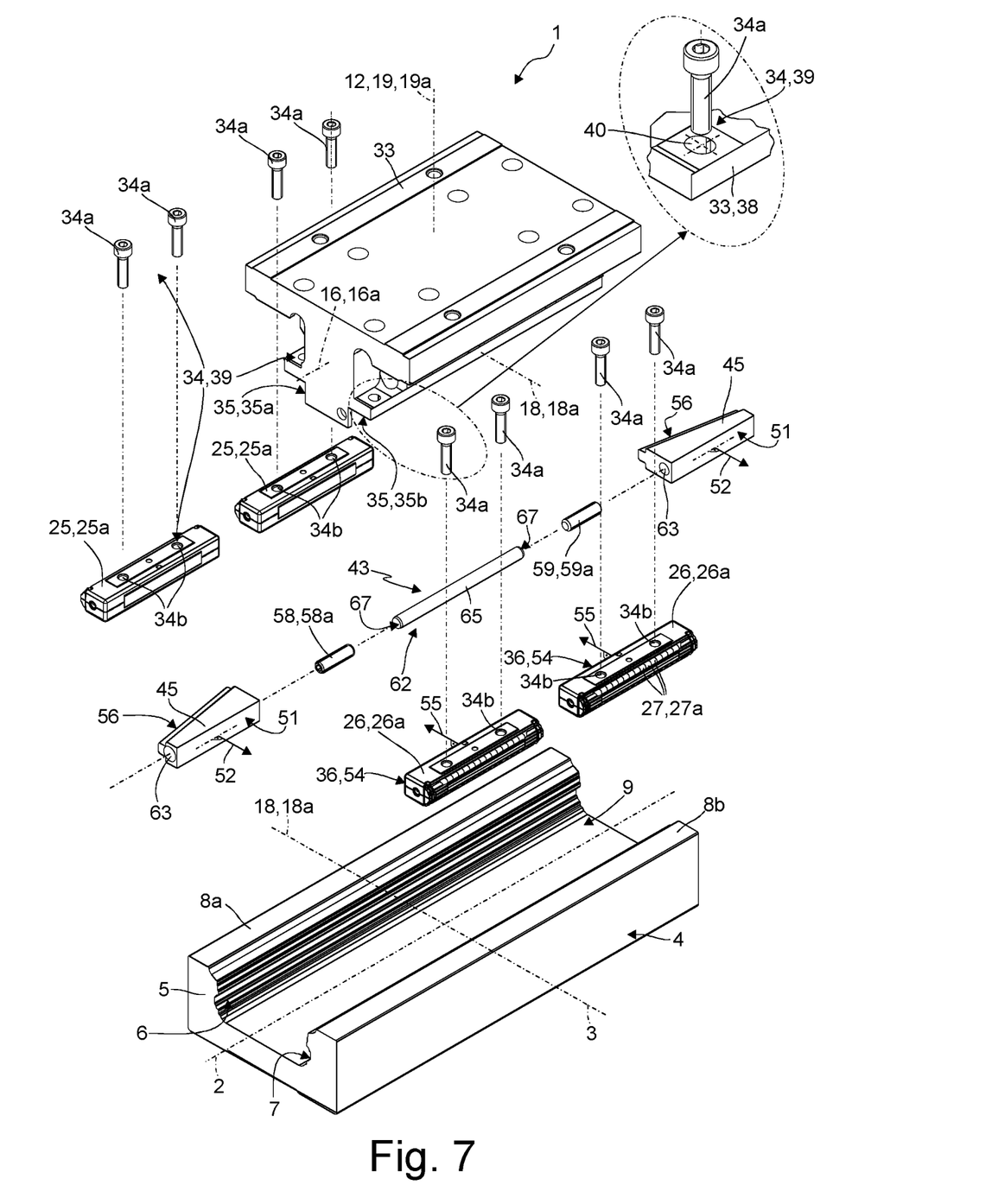

The rolling bearing elements 27a lie outside the sectional plane in FIGS. 5 and 6 and are therefore indicated by dashed lines only in FIG. 6 in one of the two second guide modules 26.

Instead of two recirculation channels 31, the recirculating ball guide modules can also have only a single recirculation channel 31 with rolling bearing elements 27a according to an unillustrated embodiment.

The guide carriage 15 has a carriage base body 33, which is preferably formed in one piece and in particular is made of metal. The guide modules 25, 26 are designed separately with respect to the carriage base body 33 and are each fixed immovably to the carriage base body 33 by means of their own fastening device 34. The fixation takes place in particular at the guide housing 28. Each fixed guide module 25, 26 is supported on a mounting surface 35 of the carriage base body 33.

In each guide unit 22, 23, the first and second guide modules 25, 26 are fastened in a working position on the carriage base body 33 by means of the associated fastening device 34 in such a way that a certain pretension is present between the two guide units 22, 23 and the associated guide surfaces 6, 7. Due to the pretension, an at least largely clearance-free adjustment of the guide components can be achieved, resulting in an extremely precise linear movement 17 even with high transverse forces and moments.

Exemplarily, one of the two guide modules 25, 26 of a respective guide unit 22, 23 is attached to the carriage base body 33 in an unchangeable working position by means of the associated fastening device 34. Exemplarily, this is the first guide module 25 in each case, which is therefore also designated as a non-adjustable guide module 25a.

Each guide module 25, 26 has a rear surface 36, exemplarily formed on the associated guide housing 28, which is opposed to the associated at least one guide element 27. Each non-adjustable guide module 25a bears with its rear surface 36 against a support section 35a of the associated mounting surface 35, the normal vector of which extends in the transverse direction 18a of the carriage.

Forces introduced into the guide elements 27 of the non-adjustable guide modules 25a are therefore introduced directly into the carriage base body 33 via the rear surface 36 and the support section 35a.

During assembly of the linear guide device 1, the non-adjustable guide modules 25a are placed to the support section 35a while the fastening device 34 is still deactivated, and are then immovably fixed by activating the fastening device 34.

In both guide units 22, 23, the pretension is adjusted exclusively by changing the relative position of the second guide module 26 with respect to the carriage base body 33 in the carriage transverse direction 18a and thus also with respect to the non-adjustable guide module 25a. The second guide module 26 is thus adjustable relative to the carriage base body 33 in the transverse direction 18a of the carriage, and therefore is also referred to as adjustable guide module 26a for better differentiation.

In the position of use of the guide carriage 15, the fastening devices 34 associated with the two adjustable guide modules 26a are activated, so that the adjustable guide modules 26a are also immovably fixed with respect to the carriage base body 33. The pretension is adjusted when the fastening devices 34 of the adjustable guide modules 26a are deactivated, wherein the adjustable guide modules 26a, which are no longer fixed, continue to be held on the carriage base body 33, but are movable with respect to the carriage base body 33 while executing an adjusting movement 37 indicated by a double arrow. The adjusting movement 37 extends in the carriage transverse direction 18a.

Preferably, the fastening devices 34 are formed as screw-connecting devices 39, which applies to the illustrated embodiment example. In this context, each fastening device 34 includes exemplary two clamping screws 34a which are arranged at a distance from each other in the carriage longitudinal direction 16a and each penetrate, in the carriage vertical direction 19a, a fastening bore 40 which is formed in a fastening portion 38 of the carriage base body 33. A surface of the mounting section 38 facing the underside 14 belongs to the mounting surface 35 and forms a clamping surface 35b to which the adjustable guide module 26a can be immovably clamped, in particular in a detachable manner, by actuating the clamping screws 34a. The clamping screws 34a each have a screw head supported on the upper side of the mounting section 38 and a threaded shaft passing through the mounting section 38 and screwed into a threaded hole 34b of the guide housing 28 of the adjustable guide module 26a.

To adjust the pretension, the screw connections that can be caused via the clamping screws 34a are or will be slightly loosened. Thereafter, the adjustable guide modules 26a are continuously held on the carriage base body 33, but are movable in this respect. The mobility results exemplarily among other things from the fact that the fastening bores 40 are formed as elongated holes, the cross-sectional longitudinal axis of which is aligned in the carriage transverse direction 18a. The threaded shafts of the loosened clamping screws 34a are thus movable in the carriage transverse direction 18a together with the adjustable guide module 26a held thereon. After the desired adjustment has been made, the screw connections are tightened.

For causing the adjusting movements 37 and accordingly for adjusting the desired pretension, each of the two guide units 22, 23 is equipped with one of two adjustment units 41, 42, wherein the adjustment unit of the first guide unit 22 also being referred to as the first adjustment unit 41 and the adjustment unit of the second guide unit 23 also being referred to as the second adjustment unit 42.

Each adjustment unit 41, 42 is capable, when actuated accordingly, of exerting an adjusting force FE oriented in the carriage transverse direction 18a on the adjustable guide module 26a of the associated guide unit 22, 23 to cause the adjusting movement 37 of the adjustable guide module 26a when the fastening device 34 is deactivated.

By pressing the adjustable guide module 26a against the second guide surface 7, the resulting counterforce causes the associated non-adjustable guide module 25a to be simultaneously pressed against the first guide surface 6. In this way, the two guide modules 25, 26 of each guide unit 22, 23 are braced between the two guide surfaces 6, 7 facing each other.

A characteristic of the linear guide device 1 is that the guide carriage 15 has a central actuating device 43 which is drivingly coupled to both the first adjustment unit 41 and the second adjustment unit 42 and by the actuation of which the adjusting forces FE can be exerted synchronously on the adjustable guide modules 26a of the two guide units 22, 23.

Since the central actuating device 43 preferably acts directly between the two adjustment units 41, 42, in particular without the cooperation of the carriage base body 33, a force balance can be established with regard to the setting forces FE between the two guide units 22, 23 to the effect that the setting force FE of the first adjustment unit 41 caused by the central actuating device 43 is at least essentially equal to the setting force FE of the second adjustment unit 42. This in turn provides the prerequisite for the specification of identical pretensions by the two guide units 22, 23.

Figure 8:
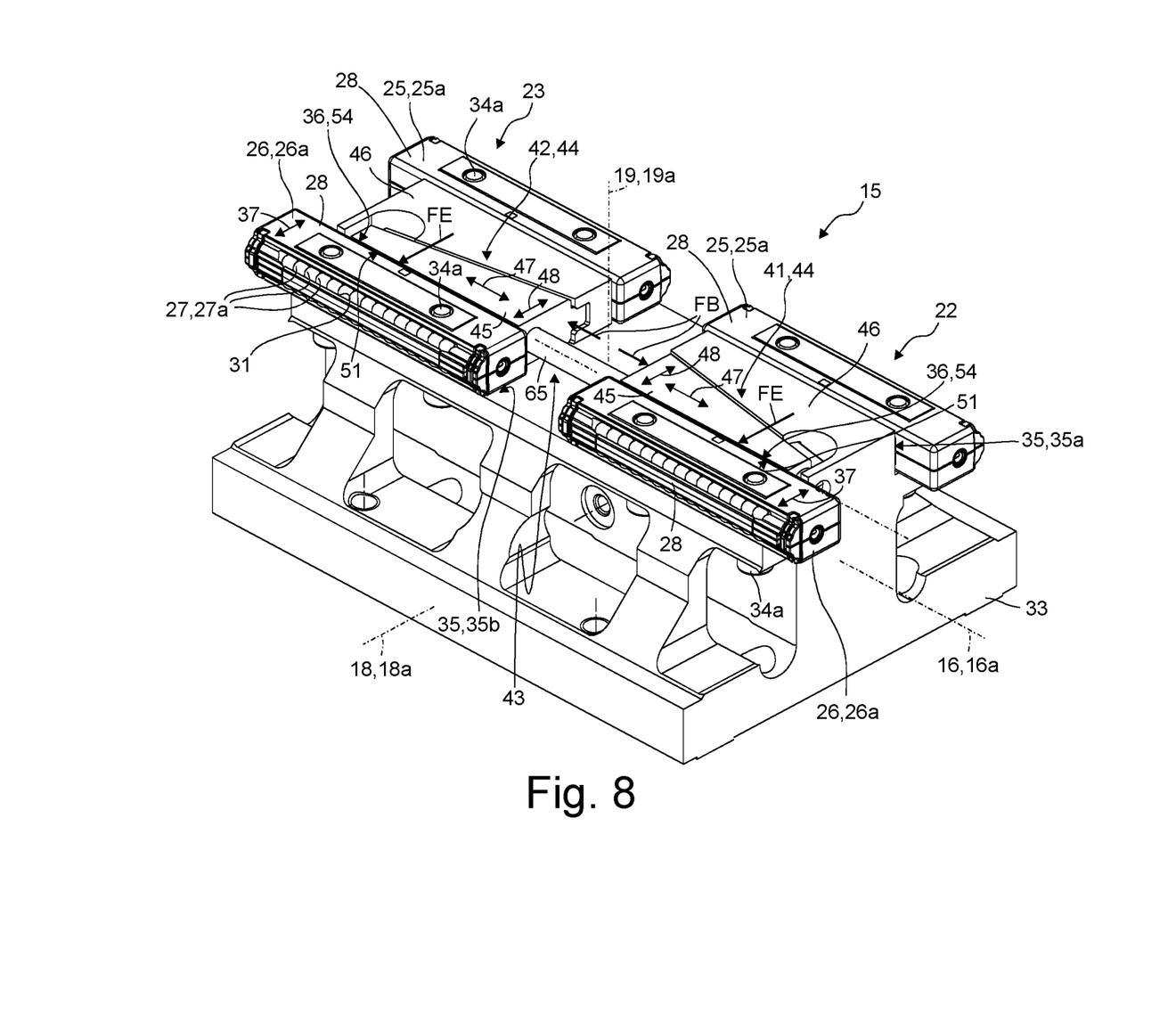
Figure 9:
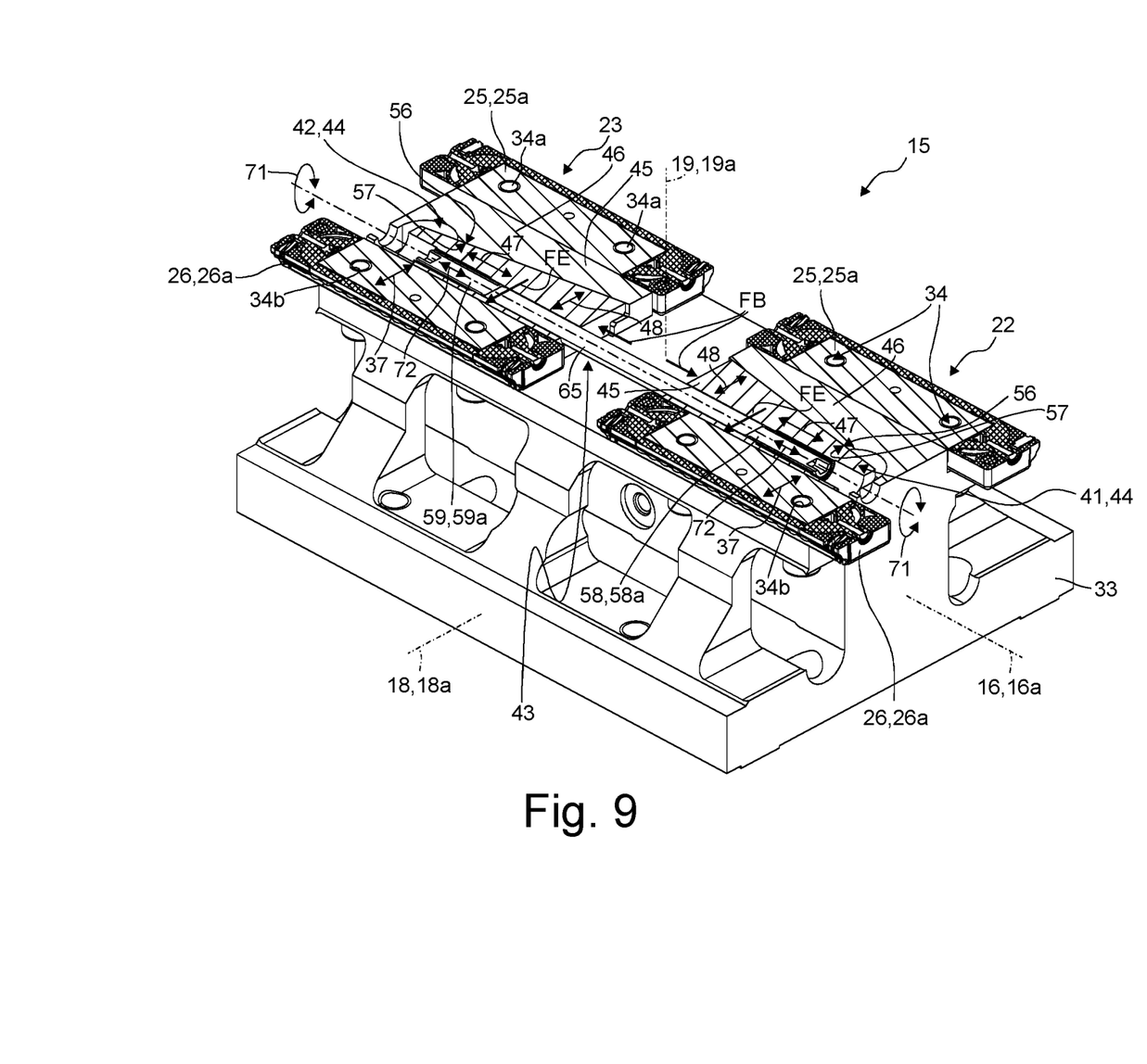

As can be seen in particular from FIGS. 8 and 9, the two adjustment units 41, 42 are preferably each arranged in the transverse direction of the carriage 18a between a first guide module 25 and a second guide module 26.

Preferably, the two adjustment units 41, 42 are each designed as a wedge gear 44, which is capable of converting an actuating force FB, generatable via the central actuating device 43 and effective in the longitudinal direction 16 of the carriage, into the desired adjusting force FE, the adjusting force FE acting on the associated adjustable guide module 26a orthogonally to the carriage longitudinal direction 16a, i.e., in the carriage transverse direction 18a.

Preferably, the wedge gear of each adjustment unit 41, 42 has a movable adjusting element 45 and an immovable adjusting element 46. The movable adjusting element 45 is movable relative to the carriage base body 33 both in the carriage longitudinal direction 16*a* and in the carriage transverse direction 18*a*. The movement in the carriage longitudinal direction 16*a* is referred to as the driving movement 47 and is indicated by a double arrow. The movement in the carriage transverse direction 18*a*, which is also indicated by a double arrow, is designated as the output movement 48. The driving movement 47 and the output movement 48 are executed simultaneously in a superimposed manner. In particular, the interaction of the adjusting elements 45, 46 results in a forced coupling such that each driving movement 47 always simultaneously results in a superimposed output movement 48.

The driving movements 47 are generatable via the central actuating device 43, the output movements 48 result from the interaction with the respectively associated immovable adjusting element 46. The immovable adjusting elements 46 are designed to be stationary, i.e., immovable, relative to the carriage base body 33 in the carriage longitudinal direction 16*a*. Preferably and exemplarily, the immovable adjusting elements 46 are not capable of any relative movement with respect to the carriage base body 33. In particular, this results from the fact that each immovable adjusting element 46 is a one-piece integral component of the carriage base body 33. In other words, integral sections of the carriage base body 33 each act as an immovable adjustment element 46.

In each adjustment unit 41, 42, the movable adjusting element 45 is arranged in the carriage transverse direction 18*a* between the adjustable guide module 26*a* and the immovable adjusting element 46.

Advantageously, there is no fixed connection between the movable adjusting element 45 and the adjacent adjustable guide module 26*a*. The movable adjusting element 45 has a pressing surface 51 facing the adjustable guide module 26*a*, which is in particular a flat surface whose normal vector 52 is orthogonal to the carriage longitudinal direction 16*a* and extends in a plane designated as the adjusting plane 53, which is spanned by the carriage longitudinal axis 16 and the carriage transverse axis 18.

The pressing surface 51 constantly abuts a force receiving surface 54 of the adjustable guide module 26*a* facing it, which is formed by its rear surface 36 and whose normal vector 54 also extends orthogonally to the carriage longitudinal direction 16*a* and extends in the adjusting plane 53.

The driving movement 47 and in this respect the superimposed output movement 48 occur in the adjusting plane 53.

During its driving movement 47, the movable adjusting element 45 can slide with the pressing surface 51 against the force receiving surface 54 abutting thereon.

Each movable adjusting element 45 has a first force deflecting surface 56 facing away from the pressing surface 51, with which it bears slidingly displaceable against a second force-deflecting surface 57 facing it and arranged on the adjacent immovable adjusting element 46.

It is advantageous that each of the two force deflection surfaces 56, 57 is formed as an oblique surface inclined to the carriage longitudinal direction 16*a* and to the carriage transverse direction 18*a*. The inclination of the two force deflection surfaces 56, 57 in contact with each other is identical. The inclination of the oblique force deflection surfaces 56, 57 with respect to the carriage longitudinal direction 16*a* advantageously has an angle of inclination 60 which lies in an angular range between 5 degrees and 15 degrees and which is preferably 10 degrees. The angle of inclination 60 can be selected such that there is a self-locking between the movable adjusting element 45 and the immovable adjusting element 46.

The two movable adjusting elements 45 are exemplary wedge-shaped and may therefore also be referred to as wedge elements of the wedge gear 44.

The force deflection surfaces 56, 57 are aligned in such a way that their normal vectors extend in the adjustment plane 53 or in a plane parallel thereto, namely parallel to one another.

The force deflection surfaces 56, 57 are preferably flat surfaces comparable to so-called inclined planes, although at least one of these two force deflection surfaces 56, 57 could also have a spherical contour, for example.

In a non-illustrated embodiment, one of the two force deflection surfaces 56, 57 is formed only punctually or linearly on a projection, in particular a cam-like projection, of the associated adjusting element 45, 46. However, the realization of both force deflection surfaces 56, 57 as mutually parallel inclined surfaces of the same inclination promises the best possible support and force transmission.

When a movable adjusting element 45 executes a driving movement 47, it slides with its first force-deflecting surface 56 against the second force-deflecting surface 57, which is stationary relative to the carriage base body 33, and is displaced in the carriage transverse direction 18*a*, resulting in an output movement 48 superimposed on the driving movement 47. Since the movable adjusting element 45 consequently displaces in the direction of the adjacent adjustable guide module 26*a*, it exerts with its pressing surface 51 an adjusting force FE on the opposite force receiving surface 54 of the adjustable guide module 26*a*, wherein the adjustable guide module 26*a* and the non-adjustable guide module 25*a* are pressed apart in the carriage transverse direction 18*a* and a desired pretension is established between the guide modules 25, 25*a*, 26, 26*a* and the guide surfaces 6, 7.

Preferably, the actuating directions of the two wedge gears 44 are opposite to each other in the carriage longitudinal direction 16*a*. This applies to the illustrated embodiment example. This functionality is achieved exemplarily by the fact that the two force deflection surfaces 56, 57 of the first adjustment unit 41 have an opposite inclination with respect to the carriage longitudinal direction 16*a* as the two force deflection surfaces 56, 57 of the second adjustment unit 42. Accordingly, in order to generate the two adjustment forces FE, the two movable adjustment elements 45 are to be driven to oppositely directed driving movements 47.

Preferably, the inclination of the two pairs of force deflection surfaces 56, 57 is matched to each other in such a way that in both cases the force deflection surfaces 56, 57 approach the associated adjustable guide module 26*a* with increasing axial distance from the respective other guide unit 22, 23. In other words, the two pairs of force deflection surfaces 56, 57 move away from the adjustable guide modules 26 with increasing axial approach. As a result, in order to cause the output movement 48, the two movable adjusting elements 45 must be driven in the sense of moving away from each other axially.

The aforementioned driving of the two movable adjusting elements 45 can be caused via the central actuating device 43. This is designed in particular and also exemplarily for manual actuation. It includes, i.e., the central actuating device 43, by way of example, two actuating members 58, 59, which are also referred to as first actuating member 58 and second actuating member 59 for better differentiation, and which can be actuated simultaneously or alternatively individually in order to generate an actuating force FB, by means of which the driving movements 47 of the two movable adjusting elements 45 are caused.

The exemplary central actuating device 43 features, for drive coupling with the two movable adjusting elements 45, a coupling structure designed in the form of a rod and referred to therein as a rod coupling structure 62, which also includes the two actuating members 58, 59. By means of the rod coupling structure 62, an adjusting force FB with respect to each movable adjusting element 45 can be generated by actuating each of the two actuating members 58, 59, the two actuating forces FB pointing away from each other in the carriage longitudinal direction 16*a*. Due to the sole coupling of the movable adjusting elements 45 via the rod coupling structure 62, at least essentially equal actuating forces FB are constantly generated at the two adjustment units 41, 42, so that consequently at least essentially equal adjusting forces FE are also constantly generated.

To realize the rod-coupling structure 62, each movable adjusting element 45 is exemplarily penetrated by a threaded hole 63 in the carriage longitudinal direction 16*a*. At least one length portion of the threaded hole 63 features an internal thread 64 in each case, into which one of two screw members 58*a*, 59*a* is screwed, these two screw members 58*a*, 59*a* each forming one of the two actuating members 58, 59.

The rod-coupling structure 62 further includes a rigid coupling rod 65 which extends in the carriage longitudinal direction 16*a* between the two movable adjusting members 45, and its two axial end portions 66 extent into the respective hole of the two threaded holes 63. A relative mobility between the coupling rod 65 and the two movable adjusting elements 45 is ensured in the carriage longitudinal direction 16*a*.

Preferably, the coupling rod 65 is simultaneously radially and linearly displaceable supported in the threaded hole 63 of each movable adjusting element 45. The end portions 66 preferably extend in an internally threadless length portion of the respective threaded hole 63 adjoining the internal thread 64.

Preferably, the coupling rod 65 and the threaded holes 63 have a circular cylindrical contour.

Each coupling rod 65 ends axially with a rod end face 67, against which the screw member 58*a*, 59*a* screwed into the same threaded hole 63 rests with an inner end face.

Each screw member 58*a*, 59*a* has, on its outer end face axially opposite the coupling rod 65, a force introduction section 68 at which a torque can be introduced in order to cause a rotary movement 71, indicated by a double arrow, of the associated screw member 58*a*, 59*a*. The force introduction section 68 is contoured in particular in such a way that a screwing tool can be applied to it. The rotary movement 71 results in a linear actuating movement 72, illustrated by a double arrow, of the relevant screw member 58*a*, 59*a* relative to the associated movable adjusting element 45 in the carriage longitudinal direction 16*a*.

The pretension for the linear guide can be adjusted by executing the rotary movement 71 of at least one of the two screw members 58*a*, 59*a*. Both screw members 58*a*, 59*a* rest with their inner end face against the facing rod end face 67. If one of the screw members 58*a*, 59*a* is turned further into the associated threaded hole 63 by manually turning the force introduction section 68 while executing an actuating movement 72, the coupling rod 65 experiences a pushing force in the direction of the other of the two movable adjusting elements 45, wherein this other movable adjusting element 45 is pushed away axially outwardly because it is acted upon by the coupling rod 65 via the screw member 58*a*, 59*a* screwed into its threaded hole 63. At the same time, the rotating movable adjusting element 45 in threaded engagement with the screw member 58*a*, 59*a* is also pressed axially outward because the rotating screw member 58*a*, 59*a* is also supported on the coupling rod 65.

Overall, there is thus a kind of floating bearing of the two movable adjusting elements 45 within the two adjustment units 41, 42, which results in the fact that regardless of which of the two screw members 58*a*, 59*a* undergoes a rotary actuation 71, both movable adjusting elements 45 are always synchronously exposed to an actuating force FB of the same magnitude, resulting in the desired adjusting forces FE of the same magnitude.

The double arrangement of screw members 58*a*, 59*a* permits convenient adjustment of the pretension from either one of the two axial end faces of the guide carriage 15.

In a non-illustrated alternative embodiment of a rod coupling structure 62, only one of the two movable adjusting elements 45 is provided with a screw member 58*a*, 59*a*, the coupling rod 65 being supported on the other of the two movable adjusting elements 45 in a non-adjustable manner in this respect.

Instead of the rod coupling structure 62, there may also be another coupling structure of the central actuating device 43 that is directly effective between the two movable adjusting elements 45. For example, a lever structure having pivot levers would be possible.

The invention claimed is:

1. A linear guide device comprising:
a guide carriage featuring a carriage base body which has two guide units arranged in succession in a carriage longitudinal direction, each guide unit having a first guide module arranged on the carriage base body and a second guide module arranged on the carriage base body at a distance opposite to the first guide module in a carriage transverse direction orthogonal to the carriage longitudinal direction,
wherein the guide carriage, in its operating position, is supported linearly movably on a base structure in the carriage longitudinal direction, wherein the two first guide modules bear against a first guide surface and the two second guide modules bear against a second guide surface of the base structure so as to be movable with respect thereto,
wherein one of the two guide modules of each guide unit is an adjustable guide module, and each of the two guide units is provided with an adjustment unit, the adjustment units being arranged in succession in the carriage longitudinal direction, by means of which the associated adjustable guide module is adjustable by an adjusting force to cause a movement oriented in the carriage transverse direction, relative to the carriage base body,
whereby a pretension is adjustable by adjusting the guide modules with the adjusting force with which the two guide modules of the guide unit are pressed against the respectively associated first or second guide surface of the base structure in the operating position of the guide carriage, and
wherein the guide carriage features a central actuating device drivingly coupled to the adjustment units of both guide units, through the actuation of which synchronous adjusting forces can be exerted on the two adjustable guide modules.

2. The linear guide device according to claim 1, wherein the two first guide modules and the two second guide modules are designed as rolling-element guide modules with rolling bearing elements provided for bearing against the guide surfaces of the base structure.

3. The linear guide device according to claim 2, wherein each of the two adjustment units is arranged in the carriage transverse direction between the first guide module and the second guide module of the associated first or second guide unit.

4. The linear guide device according to claim 1, wherein each of the two adjustment units is designed as a wedge gear by means of which an actuating force, generatable via the central actuating device and effective in the carriage longitudinal direction, can be converted into an adjusting force acting on the associated adjustable guide module orthogonal to the carriage longitudinal direction.

5. The linear guide device according to claim 4, wherein actuating directions of the two wedge gears are aligned in the carriage longitudinal direction and are oriented opposite to each other.

6. The linear guide device according to claim 1, wherein each of the two adjustment units features a movable adjusting element drivable relative to the carriage base body to perform a driving movement in the carriage longitudinal direction, and an immovable adjusting element fixed with respect to the carriage base body in the carriage longitudinal direction, wherein the movable adjusting element is force-transmittingly coupled to the adjustable guide module for exerting the adjusting force in the carriage transverse direction, and wherein each of the two adjusting elements of each adjustment unit is provided with one of two force deflecting surfaces abutting against each other in a relatively slidable manner, of which at least one force deflecting surface is formed as an oblique surface inclined with respect to the carriage longitudinal direction and to the transverse direction of the carriage.

7. The linear guide device according to claim 6, wherein the movable adjusting element of each adjustment unit features a pressing surface facing the adjustable guide module, which bears against a force-receiving surface of the adjustable guide module supported immovably with respect to the carriage base body in the carriage longitudinal direction and which, during the driving movement of the movable adjusting element, slides against the force-receiving surface while exerting the adjusting force, oriented in the carriage transverse direction, in the carriage longitudinal direction.

8. The linear guide device according to claim 7, wherein each of the two abutting force deflecting surfaces of each adjustment unit is formed as an oblique surface inclined with respect to the carriage longitudinal direction, wherein the inclination with respect to the carriage longitudinal direction of the two force deflecting surfaces belonging to the same adjustment unit is identical.

9. The linear guide device according to claim 7, wherein the at least one force deflecting surface of one of the two adjustment units has an opposite inclination with respect to the carriage longitudinal direction as the at least one force deflecting surface of the other of the two adjustment units, wherein, in order to generate the adjusting forces, the two movable adjusting elements are drivable by the central actuating device to mutually oppositely oriented driving movements with respect to the carriage longitudinal direction.

10. The linear guide device according to claim 6, wherein each of the two force deflecting surfaces of each adjustment unit is formed as an oblique surface inclined with respect to the carriage longitudinal direction, wherein the inclination with respect to the carriage longitudinal direction of the two force deflection surfaces belonging to the same adjustment unit is identical.

11. The linear guide device according to claim 10, wherein the at least one force deflecting surface of one of the two adjustment units has an opposite inclination with respect to the carriage longitudinal direction as the at least one force deflecting surface of the other of the two adjustment units, wherein, in order to generate the adjusting forces, the two movable adjusting elements are drivable by the central actuating device to mutually oppositely oriented driving movements with respect to the carriage longitudinal direction.

12. The linear guide device according to claim 6, wherein the at least one force deflecting surface of one of the two adjustment units has an opposite inclination with respect to the carriage longitudinal direction as the at least one force deflecting surface of the other of the two adjustment units, wherein, in order to generate the adjusting forces, the two movable adjusting elements are drivable by the central actuating device to mutually oppositely oriented driving movements with respect to the carriage longitudinal direction.

13. The linear guide device according to claim 6, wherein the movable adjusting element of each adjustment unit features a pressing surface facing the adjustable guide module, which bears against a force-receiving surface of the adjustable guide module supported immovably with respect to the carriage base body in the carriage longitudinal direction and which, during the driving movement of the movable adjusting element, slides against the force-receiving surface while exerting the adjusting force, oriented in the carriage transverse direction, in the carriage longitudinal direction, wherein both a normal vector of the pressing surface and a normal vector of the force-receiving surface are oriented in the carriage transverse direction.

14. The linear guide device according to claim 1, wherein the central actuating device is designed to be manually actuated and features at least one actuating member for manual actuation.

15. The linear guide device according to claim 1, wherein the central actuating device features a rod coupling structure for drive coupling with the two adjustment units, with which opposing actuating forces can be introduced synchronously into the two movable adjusting elements of the adjustment units to generate the adjusting forces in the carriage longitudinal direction.

16. The linear guide device according to claim 15, wherein each of the two adjustment units features a movable adjusting element drivable relative to the carriage base body to perform a driving movement in the carriage longitudinal direction, and an immovable adjusting element fixed with respect to the carriage base body in the carriage longitudinal direction, wherein the movable adjusting element is force-transmittingly coupled to the adjustable guide module for exerting the adjusting force in the carriage transverse direction, and wherein each of the two adjusting elements of each adjustment unit is provided with one of two force deflecting surfaces abutting against each other in a relatively slidable manner, of which at least one force deflecting surface is formed as an oblique surface inclined with respect to the carriage longitudinal direction and to the transverse direction of the carriage and wherein the rod coupling structure features a coupling rod extending between the two movable adjusting elements, the coupling rod is axially supported with respect to each movable adjusting element, wherein a rotatable actuating member of the rod coupling structure cooperating with the coupling rod is arranged on at least one movable adjusting element for axial support, wherein a rotational actuation of the rotatable actuating member changes a distance between the two movable adjusting elements, causing the driving movements of the two movable adjusting elements result.

17. The linear guide device according to claim 16, wherein each movable adjusting element of the rod coupling structure features a threaded hole extending in the carriage longitudinal direction, into which the coupling rod is axially displaceably inserted with one out of two end sections of the could rod, wherein an actuating member formed as a screw member is screwed into each threaded hole, on which the coupling rod with its associated end section is supported on an end face of the end section of the coupling rod and which is axially adjustable by rotation relative to the associated movable adjusting element.

18. The linear guide device according to claim 1, wherein the adjustable guide modules are each stationary fixed to the carriage base body by an activated fastening device, wherein the adjusting movements can be executed with the fastening devices deactivated and the adjustments made can be fixed by activating the fastening devices.

19. The linear guide device according to claim 1, wherein the linear guide has the base structure featuring a longitudinal extension, which has the first guide surface and the second guide surface spaced therefrom, wherein the guide carriage is supported linearly movably on the base structure in the longitudinal direction thereof in that the guide carriage bears movably with the first two guide modules against the first guide surface and with the second two guide modules against the second guide surface.

20. The linear guide device according to claim 1, wherein the two first guide modules and the two second guide modules are designed as rolling-element guide modules with rolling bearing elements provided for bearing against the guide surfaces of the base structure, wherein the two first guide modules and the two second guide modules are designed as recirculating ball guide modules.

21. The linear guide device according to claim 1, wherein the adjustable guide modules are each stationary fixed to the carriage base body by an activated fastening device, wherein the adjusting movements can be executed with the fastening devices deactivated and the adjustments made can be fixed by activating the fastening devices, wherein each of the fastening devices is designed as a screw-connection device which have at least one clamping screw which is tightened when the fastening device is activated and loosened when the fastening device is deactivated.

* * * * *